United States Patent
Chitrapu et al.

(10) Patent No.: US 6,894,995 B2
(45) Date of Patent: May 17, 2005

(54) APPARATUS AND METHOD FOR PERFORMING INITIAL CELL SEARCH IN WIRELESS COMMUNICATION SYSTEMS

(75) Inventors: Prabhakar R. Chitrapu, Blue Bell, PA (US); Louis J. Guccione, Eastchester, NY (US); Andrew F. Bednarz, Garden City, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 536 days.

(21) Appl. No.: 09/998,885

(22) Filed: Oct. 31, 2001

(65) Prior Publication Data

US 2003/0031162 A1 Feb. 13, 2003

Related U.S. Application Data

(60) Provisional application No. 60/300,412, filed on Jun. 22, 2001.

(51) Int. Cl.[7] .............................................. H04B 7/216
(52) U.S. Cl. ........................ 370/335; 370/350; 375/145
(58) Field of Search ................................ 370/320, 335, 370/342, 441, 479, 503, 509, 512, 514, 331, 210, 329, 330, 336, 208, 209, 332, 350, 324; 375/145, 149

(56) References Cited

U.S. PATENT DOCUMENTS

| | | | |
|---|---|---|---|
| 6,185,244 B1 | 2/2001 | Nystrom et al. | |
| 6,233,466 B1 * | 5/2001 | Wong et al. | 455/562.1 |
| 6,246,673 B1 | 6/2001 | Tiedemann, Jr. et al. | |
| 6,363,060 B1 * | 3/2002 | Sarkar | 370/342 |
| 6,480,558 B1 * | 11/2002 | Ottosson et al. | 375/350 |
| 6,597,729 B1 * | 7/2003 | Schmidl et al. | 375/149 |
| 6,665,288 B1 * | 12/2003 | Ottosson et al. | 370/342 |
| 6,717,930 B1 * | 4/2004 | Sezgin et al. | 370/335 |

FOREIGN PATENT DOCUMENTS

| | | |
|---|---|---|
| WO | WO 00/55992 | 9/2000 |
| WO | WO 00/67399 | 11/2000 |
| WO | WO 01/35564 | 5/2001 |

OTHER PUBLICATIONS

TR 101 146 v3.0.0 (Dec. 1997), "Universal Mobile Telecommunications System (UMTS); UMTS Terrestrial Radio Access (UTRA); Concept Evaluation (UMTS 30.06 version 3.0.0)" *European Telecommunications Standard Institute (ETSI)*, Dec. 1997.

* cited by examiner

*Primary Examiner*—Dang Ton
*Assistant Examiner*—Phuc Tran
(74) *Attorney, Agent, or Firm*—Volpe and Koenig, P.C.

(57) ABSTRACT

The system and method of the present invention establishes a communication link between a user equipment (UE) and a base station in a communication system having a plurality of base stations which each transmit a common primary synchronization code (PSC) in a primary synchronization channel in conjunction with a base station specific secondary synchronization code (SSC) within a system frame, which receives with the UE an input signal including the PSC and SSC from at least one of the base stations. The UE analyzes the input signal to detect any received PSCs within a selected time period which has duration corresponding to the length of a system frame and determining a relative location of a strongest PSC within the selected time period. The input signal is then processed to remove the PSC from at least the determined PSC location. A secondary synchronization code (SSC) is then detected for the determined location from the processed signal. The communication link is then established using the detected SSCs.

14 Claims, 5 Drawing Sheets

N3 = NUMBER OF ITERATIONS FOR STEP-3

APPARATUS AND METHOD FOR PERFORMING INITIAL CELL SEARCH IN WIRELESS COMMUNICATION SYSTEMS

BACKGROUND

The present invention relates to user equipment (UE) synchronization to a base station. More specifically, the present invention relates to an improved initial cell search method and system.

Figure 1:
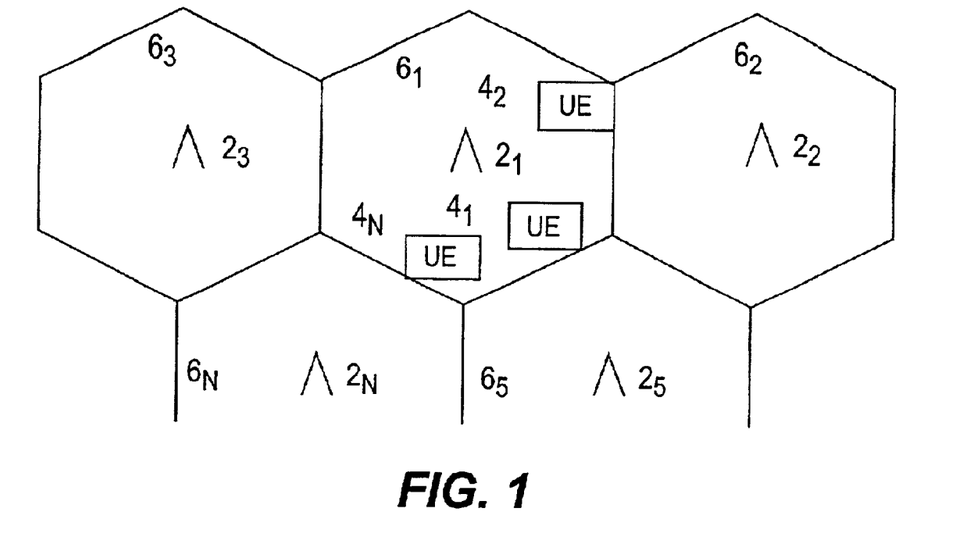
FIG. 1 is an illustration of a wireless communication system.

FIG. 1 illustrates a wireless communication system. The communication system has a plurality of base stations $2_{1-2n}$ (2). Each base station 2 communicates with user equipments (UEs) $4_1-4_n$ (4) within its operating area or cell $6_1-6_n$ (6).

When a UE 4 is first activated, it is unaware of its location and which base station 2 (or cell 6) to communicate. The process where the UE 4 determines the cell 4 to communicate with is referred to as "cell search."

Figure 2A:
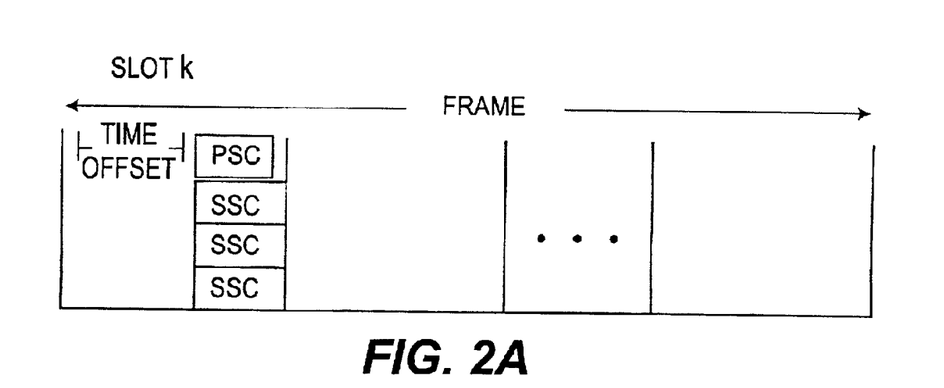
FIGS. 2a and 2b are illustrations of the physical synchronization channel (PSCH) for case 1 and case 2, respectively.
Figure 2B:
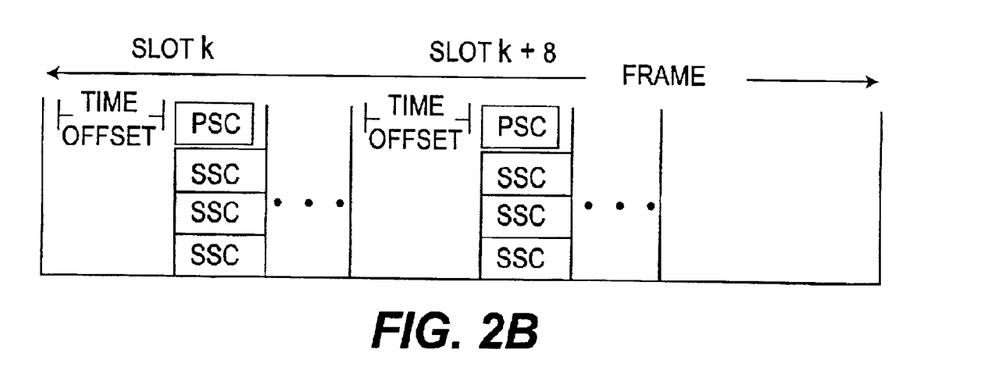
Figure 3:
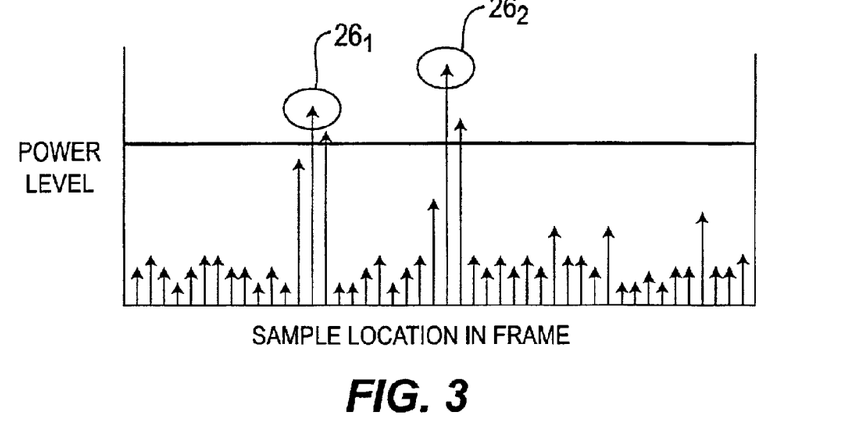
FIG. 3 is an illustration of peaks in a PSCH.

In typical code division multiple access (CDMA) communication systems, a multi-step process is used for cell search. For step one, each base station 2 transmits the same primary synchronization code (PSC) in a primary synchronization channel (PSCH). In a time division duplex (TDD) communication system using CDMA, the PSCH is one timeslot out of fifteen for case 1 cell search (as shown in FIG. 2a), such as slot 0 or in general K, or two timeslots for case 2 cell search (as shown in FIG. 2b), such as slots 0 or in general K and K+8 and 8. Each base station transmits the same PSC in the PSCH timeslot(s). To reduce interference between secondary synchronization codes (SSCs) used in step two, each PSC is transmitted at a different time offsets. The PSC offsets are at a set number of chips.

Figure 4:
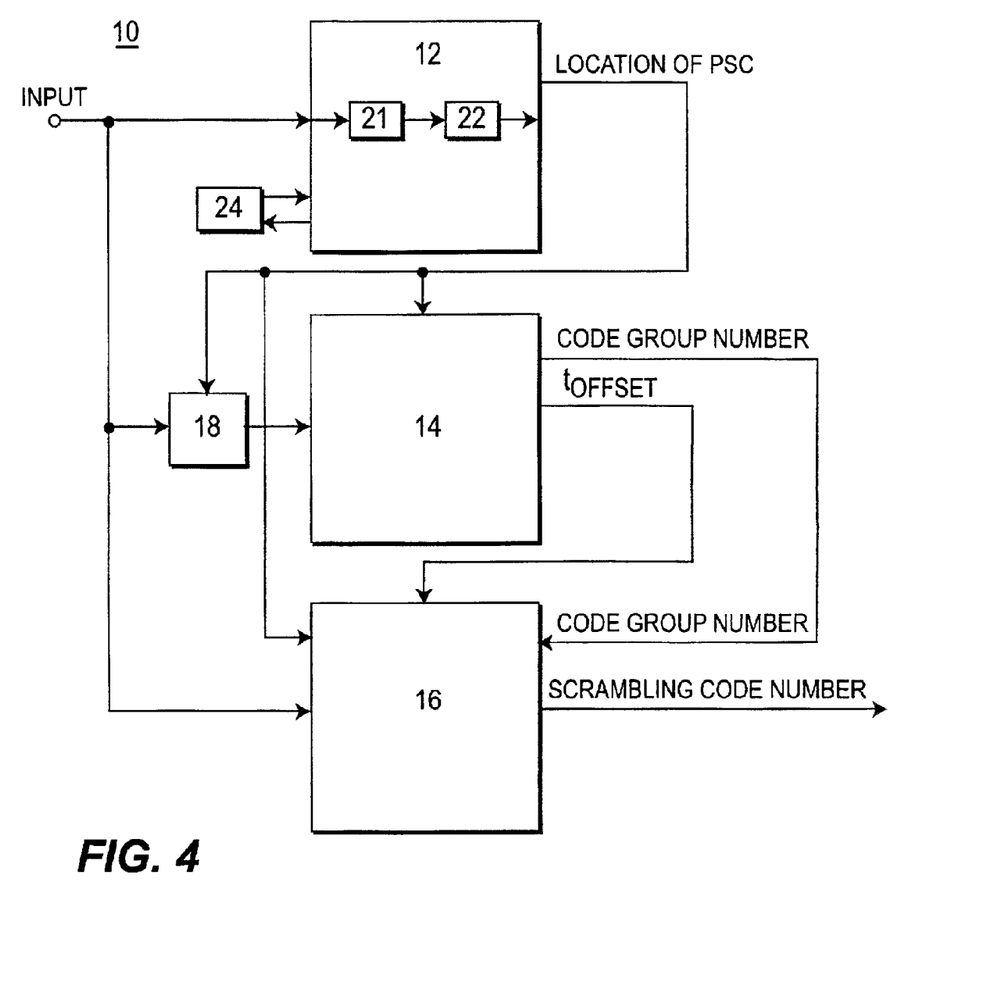
FIG. 4 is a block diagram of the initial cell search system of the present invention.

The UE 14 determines the base station 12 to be synchronized to by searching the PSCH for received PSCs, such as using a matched filter. An example of the results of such a search are shown in FIG. 4. As shown in FIG. 4, peaks $26_1-26_2$ occur in the PSCH where there is a high correlation with the PSC code. Typically, the search results are accumulated over multiple frames to improve accuracy. Using the accumulated results, the PSC peak locations are determined in the PSCH.

Referring back to FIGS. 2a and 2b, along with each base station's transmitted PSC, each base station 12 also simultaneously transmits secondary synchronization codes (SSCs), such as three, for both TDD case 1 and case 2. The SSCs sent by each base station 14 are used to identify certain cell parameters, such as the code group and frame timing used by the cell. The UE 14 typically uses a correlator to detect the SSCs and the data modulated on them at each PSC peak identified in step I. The UE 14 to read the broadcast control channel. In TDD step III for both types I and II, typically, the UE 14 detects the midamble used in the broadcast channel and subsequently reads the broadcast channel.

A drawback of the initial cell search system described above is that the performance of the second step (SSC detection) is governed by the quality of the received signal which could result in false detections if this signal is of poor quality. In past systems, the second step, receives no benefit from successful execution of step 1.

Accordingly, there is a need for an initial cell search system wherein the second step's performance is not solely governed by the received input signal, providing more accurate SSC detection.

SUMMARY

The system and method of the present invention establishes a communication link between a user equipment (UE) and a base station in a communication system having a plurality of base stations which each transmit a common primary synchronization code (PSC) in a primary synchronization channel in conjunction with a base station specific secondary synchronization code (SSC) within a system frame, which receives with the UE an input signal including the PSC and SSC from at least one of the base stations. The UE analyzes the input signal to detect any received PSCs within a selected time period which has duration corresponding to the length of a system frame and determining a relative location of a strongest PSC within the selected time period. The input signal is then processed to remove the PSC from at least the determined PSC location. A secondary synchronization code (SSC) is then detected for the determined location from the processed signal. The communication link is then established using the detected SSCs.

DETAILED DESCRIPTION OF THE PREFERRED EMBODIMENTS

The preferred embodiments will be described with reference to the drawing figures where like numerals represent like elements throughout.

The initial cell search system 10 in accordance with the preferred embodiment of the present invention is illustrated in FIG. 4. The system 10 comprises a step 1 processor 12, a cancellation device 18, a step 2 processor 14, and a step 3 processor 16, to accomplish initial synchronization between a user equipment (UE) and a base station.

Step 1 of the initial cell search algorithm is accomplished using the step 1 processor 12. FIG. 4 shows one implementation of a step 1 processor, although others may be used. The step 1 processor 12 comprises a Hierarchical Golay Correlator (HGC) 21 and a PSC decision device 22. The purpose of the step 1 processor 12 is to find the strongest base station's PSC over a frame or multiple frames worth of samples. A chip sampled input signal I is received by the UE and processed by the HGC 21. The HGC 21 is a reduced complexity implementation of the correlation process between PSC and the input signal I at consecutive chip locations. The output of the HGC 21 represents the magnitudes of the detected PSC power levels for those base stations detected by the HGC 21. The base stations' PSCs with a high received power level appear as peaks in the frame. The outputs from the HGC 21 are output to the PSC decision device 22.

The PSC decision device 22, coupled to the HGC 21, receives the correlation values output by the HGC 21 for each chip in a frame worth of chips. A frame's worth of chips is preferably equivalent to the system frame, which by way of example, is equivalent to 38,400 chips. As those having skill in the art know, the system frame can be more or less than that which is used in this disclosure.

The decision device 22 stores each chip correlation value from the HGC 21 over a predetermined number of frames N and averages each chip's correlation values. As an example, a system frame is 4 chips long, and N=2. The HGC 21 outputs the correlation values $A_1$, $B_1$, $C_1$, and $D_1$, respectively for each of the four chips. The decision device 22 stores these values and receives the output of the next frame's correlation values for each chip from the HGC 21, which are $A_2$, $B_2$, $C_2$, $D_2$. Each chip's correlation values are then averaged, (i.e., $A_1+A_2/2$; $B_1+B_2/2$; $C_1+C_2/2$; $D_1+D_2/2$).

Once the decision device 22 finds the average correlation value for each average correlation chip in a frame, the position of the maximum average of the frames is determined and its value compared with a determined threshold. The threshold is based on the noise level (i.e., interference plus thermal noise) at the receiver. The noise estimator 24 has an auxiliary HGC (not shown) that is based on a code which has very low cross correlation with the PSC and the SSCs. The noise estimator HGC calculates a noise estimate for every chip in the system frame. The noise estimator iterates over the same number of frames as the HGC 21 and averages several of the noise estimates in a window around the estimated PSCH location. The window size is preferably about 128, i.e., 64 chips on both sides of the PSCH location. As those having skill in the art know, the window size may be larger or smaller than 128.

If the maximum average is greater than the threshold, the decision device 22 determines whether the transmission pattern of the base station associated with the maximum average location is case 1 or case 2. This determination is made by comparing the correlation value of the chip at the maximum location +(8*2560) or maximum location +(7*2560). If this value is greater than the threshold, then the transmission pattern is case 2. Otherwise, the transmission is case 1.

If the maximum location value is less than the threshold, the step 1 processor 12 continues processing the input signal I until a correlation value greater than the threshold is found or a failed condition met. As those skilled in the art know, the decision processor 22 may utilize any of a number of methods for determining the location of the strongest PSC code. Once the maximum location is found, the decision processor 22 forwards the location and the PSC to the cancellation device 18 and the step 2 processor 14.

The cancellation device 18, coupled to the step 1 processor 12 and the step 2 processor 14, takes the maximum location, the PSC and the input signal I and subtracts the PSC from the input signal I. This subtraction eliminates the PSC from the chip at the maximum location in the input signal I. The subtraction of the PSC from the input signal I can be done by one of several cancellation methods, such as interference cancellation. Using interference cancellation, the PSC is converted, using an interference construction device (not shown), into an estimate of its contribution to the input signal I. The received PSC's contribution is subtracted, such as by a subtractor. The resulting signal has the PSC's contribution removed from the input signal I at the maximum location. In code multiplexing systems, one code appears as noise to other codes. Accordingly, the PSC is essentially noise to the SSC. As a result, when the PSC is cancelled from the input signal I, the step 2 processor 14 is able to locate the SSC and slot offset with greater accuracy and speed.

The step 2 processor 14, coupled to the cancellation device 18, the step 1 processor 12 and the step 3 processor 16, receives the modified input signal from the cancellation device 18 and the location of the PSC from the step 1 processor 22.

Figure 5:
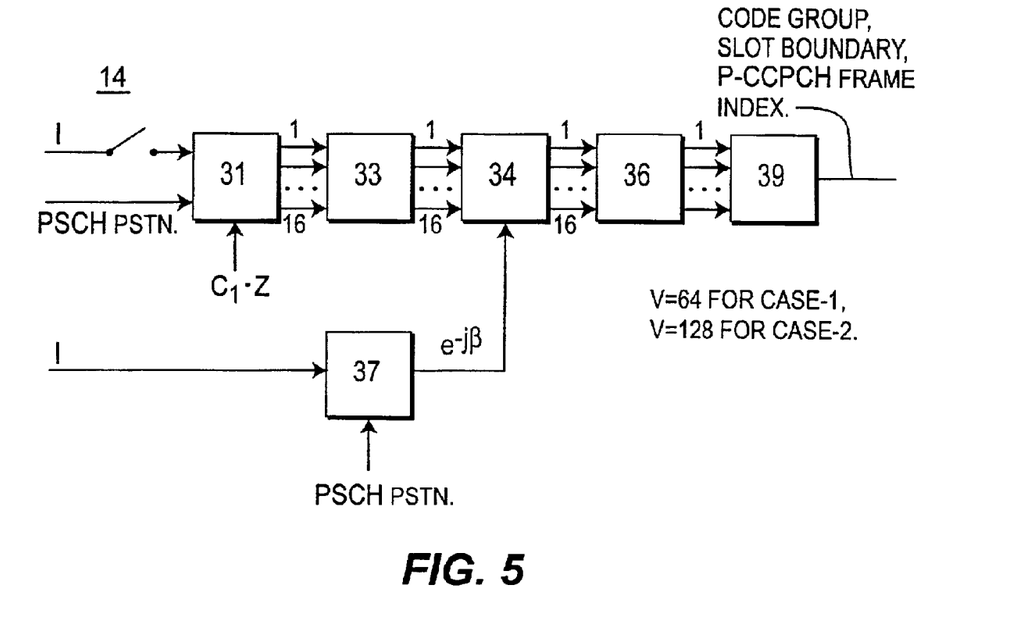
FIG. 5 is an exemplary block diagram of a step 2 processor.

One example of a step 2 device is illustrated in FIG. 5, although others may be used. This step 2 device comprises correlator 31, a fast Hadamard transform device (FHT) 33, phase estimator device 37, a derotate device 34, an accumulator 36, and a decision device 39. Since the location of the PSC has been determined by the step 1 processor 12, then the step 2 processor 14 need only search for the SSCs in the maximum location input from the step 1 processor 12. In this step, the UE identifies the code group and the $t_{offset}$ associated with the base station at the maximum location. The step 2 processor 14 also determines the frame index number within the interleaving period of two frames and it determines the slot index (K or K+8). As those skilled in the art know, the $t_{offset}$ determined in this step allows the UE to synchronize to the slot boundary. The modified input signal and the position of the PSC are input to the correlator 31. The correlator 31, coupled to the FHT 33 and the cancellation device 18, correlates the received input signal with the length 256 chip code at the PSC position to obtain 16 correlation values. This code, $C_R$, is obtained from chip by chip multiplication of first SSC, $C_1$, and a masking sequence, Z. This is shown below:

$$C_r(i)=C_1(i)*z(i), i=0,\ldots,255 \qquad \text{Equation 1}$$

The 16 complex correlation values, $R_c$ (K) are obtained using the above code. $R_c$ (K) is obtained by the following equation 2:

$$r_c(k,n) = \sum_{i=0}^{15} c_r(16k+i)R_x(t_{cp}+16k+i,n), \qquad \text{Equation 2}$$

$$k=0,\ldots,15; n=0,\ldots,N$$

Where $t_{cp}$ is the PSC position obtained from the step 1 processor 12 and N is the maximum number of PSCH time slots used for averaging.

The correlation values obtained at the output of the correlator 31 are applied to the FHT 33. The FHT 33 is coupled to the correlator 31 and a derotate device 34, obtains 16 complex correlation values that correspond to the correlation of 16 SSCs and the received signal. That is, $$r_f(k,n) = FHT\{r_{c(k,n)}\}, \qquad \text{Equation 3}$$

$$\approx \sum_{i=0}^{255} c_{k(i)\cdot z(i)} \cdot R_x(t_{cp}+i,n), k=0,\ldots,15;$$

$$n=0,\ldots,N$$

As those skilled in the art know, taking FHT of $R_c(K)$'s is equivalent to the correlation of unmasked SSCs with the received signal. This is possible due to the special structure of the 16 SSCs. Please note that a case 1 signal uses six (6) SSCs and a case 2 signal uses twelve (12) SSCs. Four (4) SSCs are unused.

The phase estimator 37 receives the modified chip sampled received signal, as well as the PSC position from the step 1 processor 12. The output of the step 1 HGC 21 at the PSC position corresponds to the correlation of the PSC with the received signal at the PSC position. This complex correlation value is the input to the phase estimator 37. In this phase estimator 37, the complex correlation value is normalized and then conjugated. The phase estimation is necessary for the derotation of the SSCs.

The derotate device 34, coupled to the phase estimator 37 and the FHT 33, receives the 16 SSCs from the FHT 33 and the phase estimation from the phase estimator 37. The derotate device 34 derotates the output of the FHT 33. The derotation phase is the phase of the PSC. The complex correlation values are complex multiplied with the phase.

The derotated correlation values are then forwarded to the accumulator 36. The accumulator 36 is coupled to the derotate device 34 and the step 2 decision device 39. The derotated correlation values are added coherently with a period of two (for case 1) or four (for case 2), for N iterations in accordance with equation 4:

$$r_a{}^l(k,n) = r_a{}^l(k,n-1) + rd(k,n)\delta(l-n \bmod L), k=0,\ldots,K; n=0,\ldots,N; l=0,\ldots L \quad \text{Equation 4}$$

where N is the maximum number of iterations to obtain a reliable signal value, K is the number SSCs used (K=6 for case 1 and K=12 for case 2) and L is periodicity of PSCH (L=2 for case 1 and L=4 for case 2). These correlation values are initially set to zero. The decision variables are formed from the correlation values according to the SSC transmission patterns.

The decision variables obtained in the accumulator 36 are forwarded to the decision device 39. There are 64 decision variables for case 1,32 code groups and 2 frames indices. For case 2, there are 128 decision variables, 32 code groups, 2 frame indices and 2 slots (K or K+8). The decision device 39 compares all the decision variables sequentially (one by one). This scheme is efficient since the number of decision variables is not large and the scheme can be implemented without much complexity. The transmission pattern that the maximum decision variable belongs to indicates the code group number of case 1 and case 2 and PSCH slot index for case 2.

Figure 6:
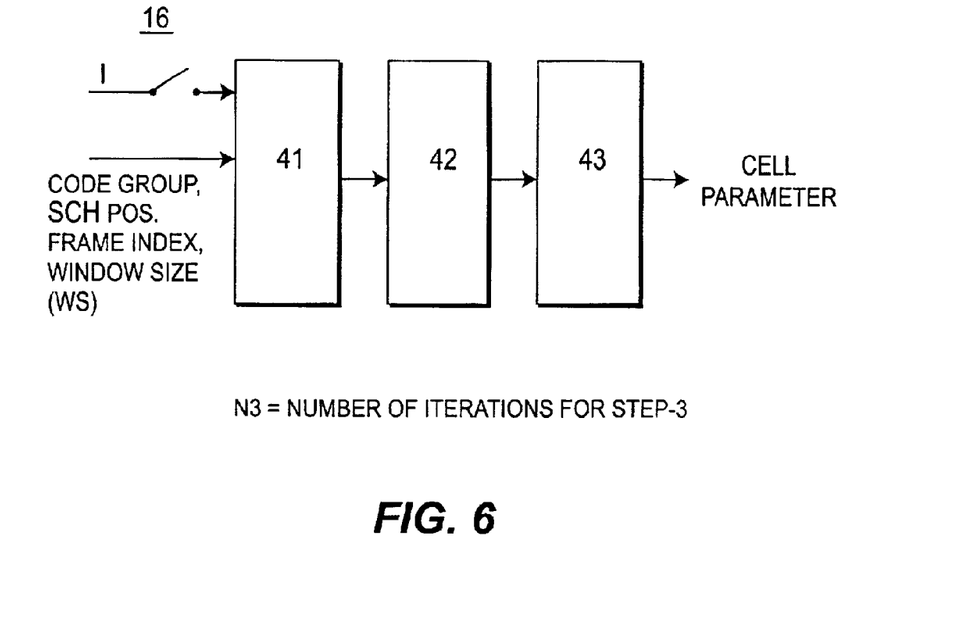
FIG. 6 is an exemplary block diagram of a step 3 processor.

The $t_{offset}$, scrambling code group number, SSCs, and the location of the PSC are then forwarded to the step 3 processor 16. The step 3 processor 16, coupled to the step 2 processor 14, retrieves the midambles and primary scrambling code that are used by the UE. The code group number retrieved by the step 2 processor 14 is associated with four cell parameters. Therefore, identification of the code group number identifies the midamble codes used by the cell. The four cell parameters associated with the code group are cycled through System Frame Numbers (SFNs) as depicted in Table 1.

TABLE 1

| Code Group | Cell Parameter (initially assigned) | Cell Parameter (SFN mod 2 = 0) | Cell Parameter (SFN mod 2 = 1) |
|---|---|---|---|
| i = 1, . . . , 32 | 4(i − 1) | 4(i − 1) | 4(i − 1) + 1 |
|  | 4(i − 1) + 1 | 4(i − 1) + 1 | 4(i − 1) |
|  | 4(i − 1) + 2 | 4(i − 1) + 2 | 4(i − 1) + 3 |
|  | 4(i − 1) + 3 | 4(i − 1) + 3 | 4(i − 1) + 2 |

FIG. 6 illustrates an exemplary step 3 processor 16. Although a step 3 processor is illustrated, any step 3 processor may be utilized. The step 3 processor 16 comprises a correlation device 41, an accumulation device 42, and a decision device 43. The correlation device 41 is forwarded to the code group and frame index from the step 2 processor 14, and the PSC position from the step 1 processor 12. A periodic window size pWS and multipath window size mpWS are also input to the correlation device 41. The input signal I is correlated with the four (4) midambles that are associated with the code group by the correlation device 41. The correlation is performed at WS3 calculated candidate midamble locations on the P-CCPCH which are determined by the $t_{offset}$ of the code group, the periodic window size pWS and the multipath window size mpWS; where WS3=pWS+2mpWS.

The basic midamble code toggles with the SFN (odd/even). If the SFN is even, the correlation device 41 correlates against the basic midamble code. If the SFN is odd, the correlation device 41 correlates against the cycled midamble code. For example, in the case of code group 0, the correlation device 41 correlates against midamble codes 0,1,2 and 3 on even SFN, and the correlation device 41 correlates against midamble codes 1,0,3 and 2 on odd SFN. It should be noted that cell search does not know the SFN, but it does know whether the SFN is even or odd based on the frame index (1 or 2) found by the step 2 processor 14.

The correlation device 41 calculates 4×WS3 correlations. The periodic window allows the correlation device 41 to find the maximum correlation. The purpose of the multipath window is to adjust the PSCH position to include the maximum amount of multipath. This may be necessary if the strongest multipath component is not the first significant multipath component.

The correlation values output from the correlation device 41, are forwarded to the accumulation device 42 which is coupled to the correlation device 41 and the decision device 43. The accumulation device 42 accumulates the correlation values over a predetermined number of frames N3. It should be noted that initial cell search does not know frame boundaries so the initial cell search system typically uses blocks of 38400 chips (2560 chips×15 slots) in lieu of frames. The accumulation device 42 forms the decision variables by adding the absolute value of the real and imaginary parts of the complex number that represents the correlation value. A decision variable is the magnitude measure of the corresponding correlation value. In order to have a more reliable decision, these decision variables can be accumulated for N3 iterations, where N3 is the maximum number of iterations for a reliable signal to noise ratio level.

The decision variables generated by the accumulation device 42 are forwarded to the decision device 43. The decision device 43, coupled to the accumulation device 42, determines the maximum decision variable by simple sequential comparison. The maximum decision variable corresponds to the basic midamble used for the cell. The scrambling code number associated with the identified midamble is the scrambling code of the cell. The scrambling code is then utilized by the UE for broadcast channel processing.

Figure 7:
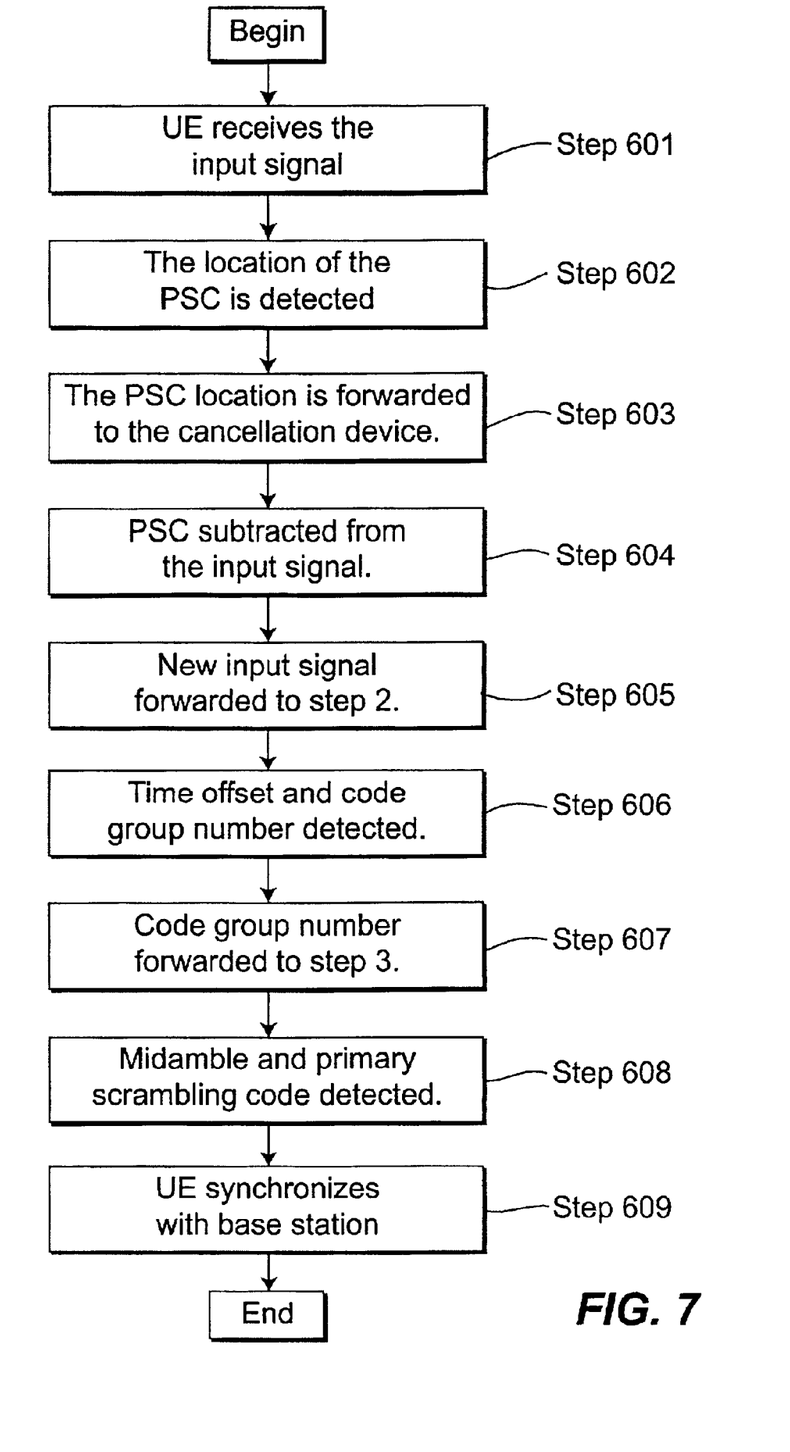
FIG. 7 is a flow diagram of the initial cell search system of the present invention.

The flow diagram for the initial cell search system is illustrated in FIG. 7. The UE receives the input signal over the common downlink channel (step 601). The step 1 processor 12 detects the location of the PSC associated with the strongest base station (step 602). The step 1 processor 12 forwards the PSC to the cancellation device 18 (step 603). The cancellation device 18 then subtracts the PSC detected from the step 1 processor 12 from the input signal I (step 604) and forwards this modified signal to the step 2 processor 14 (step 605). Using the modified input signal from the cancellation device 18 and the location of the PSC from the step 1 processor 12, the step 2 processor 14 retrieves the SSCs and determines $t_{offset}$ and the code group number associated with the strongest base station (step 607). The code group number is then forwarded to the step 3 processor 16 (step 608) which retrieves the midambles and primary scrambling codes therefrom (step 609). These codes are then used by the UE to synchronize to the base station (step 610).

Since the second step of the initial cell search is the weakest, the cancellation of the PSC from the signal input to the step 2 processor 14 provides a cleaner signal and results in a better estimation of the SSCs time. This results in a more accurate slot offset and code group number determination. Ultimately, this procedure reduces the number of false detections by the UE.

Figure 8:
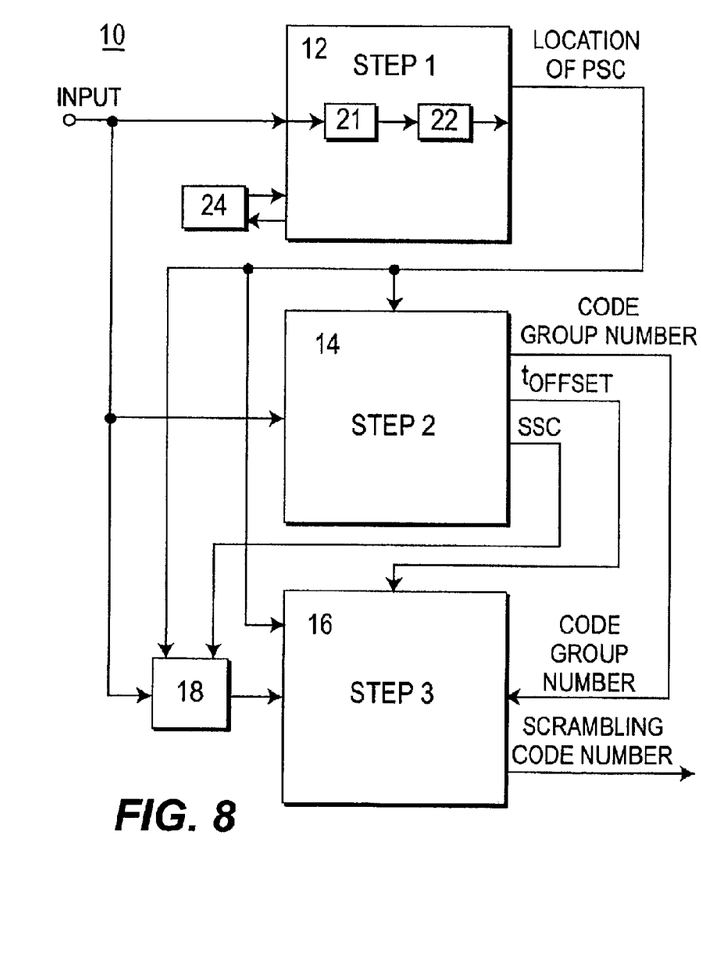
FIG. 8 is a block diagram of a second embodiment of the initial cell search system.

A second embodiment is illustrated in FIG. 8. Similar to the system of FIG. 1, the system of this second embodiment utilizes a cancellation device $18_2$ to subtract the PSC and SSCs from the input signal I before processing by the step 3 processor 16. Step 2 does not receive a PSC removed input signal, instead the modified input signal to the step 3 processor 16 is able to more accurately detect the midamble and code group of the detected base station.

Figure 9:
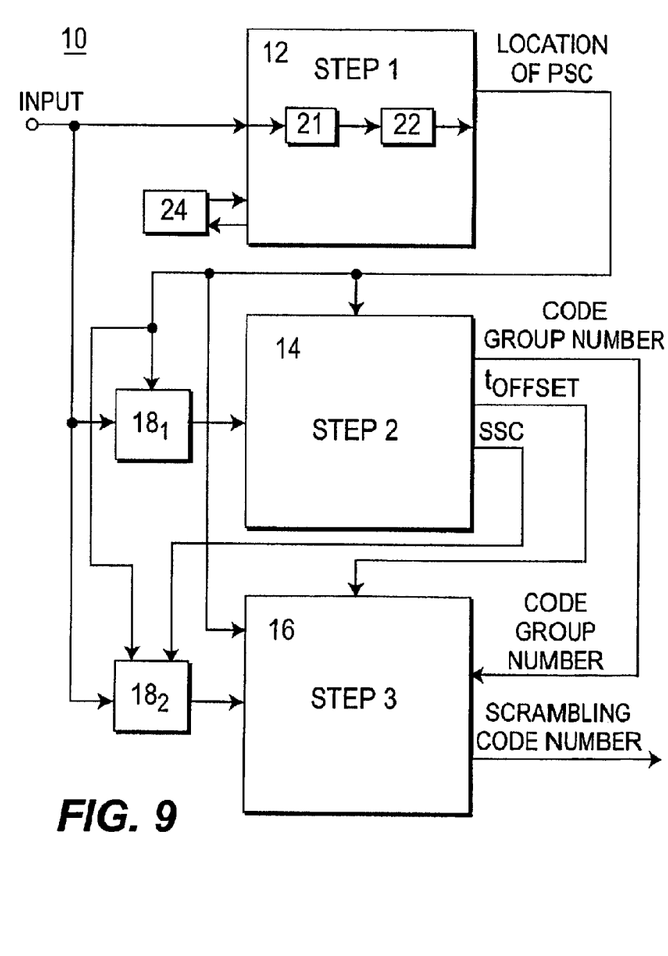
FIG. 9 is a block diagram of a third embodiment of the initial cell search system.

A third embodiment is illustrated in FIG. 9. This third embodiment utilizes the cancellation devices $18_1$ and $18_2$ to improve the accuracy of the initial cell search system 10. The cancellation device $18_1$ removes the PSC from the detected location in the input signal prior to the step 2 processor 14. The cancellation device $18_2$ removes the SSCs prior to the step 3 processor 16.

What is claimed is:

1. A method for establishing a communication link between a user equipment (UE) and a base station in a communication system having a plurality of base stations which each transmit a common primary synchronization code (PSC) in a primary synchronization channel in conjunction with a base station specific secondary synchronization code (SSC) within a system frame, the method comprising:

receiving with the UE an input signal including the PSC and SSC from at least one of the base stations;

analyzing said input signal to detect received PSCs within a selected time period frame and determining a relative location of a strongest PSC within system frame; and processing said input signal to remove the PSC from at least the determined PSC location, and detecting a secondary synchronization code at the determined location from the processed signal.

2. The method of claim 1 further comprising the step of detecting a scrambling code number for determining cell parameters of a base station associated with said detected SSCs.

3. The method of claim 2 wherein said removal of said detected PSC includes interference cancellation.

4. The method of claim 1 further comprising the steps of:

processing said input signal to remove the PSC and SSC from at least the determined PSC location; and detecting a scrambling code number from the processed signal for determining cell parameters of a base station associated with said detected SSC.

5. The method of claim 4 wherein said removal of said detected PSC and said SSC includes interference cancellation.

6. A communication system including a plurality of base stations which each transmit a common primary synchronization code (PSC) in a primary synchronization channel in conjunction with a base station specific secondary synchronization code (SSC) within a system frame, and a user equipment (UE) comprising a cell search system for establishing a communication link between a UE and a base station, the UE for receiving an input signal including the PSC and SSC from at least one of the base stations, said cell search system comprising:

a first processor analyzing said input signal to detect received PSCs within a selected time period and determining a relative location of a strongest PSC within the system frame;

a cancellation processor for processing said input signal to remove the PSC from at least the determined PSC location; and second processor for detecting said SSCs at the determined location from the processed signal.

7. The system of claim 6 wherein said cell search system further comprises a third processor, responsive to said SSCs, for detecting a scrambling code number of the base station associated with said determined location.

8. The system of claim 7 wherein said cancellation processor uses interference cancellation to remove said PSC from said input signal.

9. A user equipment (UE) comprising a cell search system for establishing a communication link between the UE and a base station in a communication system having a plurality of base stations which each transmit a common primary synchronization code (PSC) in a primary synchronization channel in conjunction with a base station specific secondary synchronization code (SSC) at a different time within a system frame, said UE receiving an input signal including the PSC and SSC from at least one of the base stations;

said cell search system comprising:

a first processor analyzing said input signal to detect received PSCs within a selected time period which has a duration corresponding to the length of a system frame and determining a relative location of a strongest PSC within the selected time period;

a cancellation processor for processing said input signal to remove the PSC from at least the determined PSC location; and second processor for detecting said SSCs for the determined location from the processed signal;

said system using the detected SSCs to establish the communication link.

10. The UE of claim 9 wherein said cell search system further comprises a third processor, responsive to said SSCs, for detecting a scrambling code number of the base station associated with said determined location.

11. The UE of claim 10 wherein said cancellation processor uses interference cancellation to remove said PSC from said input signal.

12. A method for establishing a communication link between a user equipment (UE) and a base station in a communication system having a plurality of base stations which each transmit a common primary synchronization code (PSC) in a primary synchronization channel in conjunction with a base station specific secondary synchronization code (SSC) within a system frame, the method comprising:

receiving with the UE an input signal including the PSC and SSC from at least one of the base stations;

analyzing said input signal to detect received PSCs within a selected time period frame and determining a relative location of a strongest PSC within system frame;

detecting a secondary synchronization code at the determined location from said input signal; and processing said input signal to remove the PSC and SSC from at least the determined PSC location.

13. The method of claim 12 further comprising the step of detecting a scrambling code number from the processed signal for determining cell parameters of a base station associated with said detected SSC.

14. The method of claim 2 wherein said removal of said detected SSC includes interference cancellation.

* * * * *

UNITED STATES PATENT AND TRADEMARK OFFICE
CERTIFICATE OF CORRECTION

PATENT NO. : 6,894,995 B2
DATED : May 17, 2005
INVENTOR(S) : Chitrapu et al.

It is certified that error appears in the above-identified patent and that said Letters Patent is hereby corrected as shown below:

Column 1,
Line 11, after the word "stations", delete "$2_{1-2n}$" and insert therefor -- $2_1$-$2_n$ --.
Line 13, before the word "within", delete "$4_l4_n$" and insert therefor -- $4_1$-$4_n$ --.
Line 13, after the word "cell", delete "$6_l$-$6_n$" and insert therefor -- $6_1$-$6_n$ --.
Line 16, after the word "cell", delete "4" and insert therefor -- 6 --.
Line 32, after the word "UE", delete "14" and insert therefor -- 4 --.
Lines 32 and 42, after the word "station", delete "12" and insert therefor -- 2 --.
Line 45, after the word "station", delete "14" and insert therefor -- 4 --.
Lines 47, 49 and 51, after the word "UE", delete "14" and insert therefor -- 4 --.
Line 49, after the word "14", delete "to read" and insert therefor -- reads --.

Column 3,
Line 17, after the word "$A_1$", delete ",".

Column 4,
Equation 1, line 34, delete "$C_r(i)=C_l(i)*_z(i), i=0,...,255$" and insert therefor
-- $c_r(i)=c_l(i)*z(i), i=0,...,255$ --.
Equation 3, line 55, delete "$r_f(k, n)=FHT(r_{c(k,n)})$" and insert therefor
-- $r_f(k, n)=FHT\{r_c(k,n)\}$ --.
Equation 3, line 56, delete and insert therefor "$\approx \sum_{i=0}^{255} c_{k(i) \cdot z(i)} \cdot R_X(t_{cp}+i,n), k=0,...,15;$"

and insert therefor -- $\approx \sum_{i=0}^{255} c_k(i) \cdot z(i) \cdot R_X(t_{cp}+i,n), k=0,...,15;$ --.

UNITED STATES PATENT AND TRADEMARK OFFICE
CERTIFICATE OF CORRECTION

PATENT NO. : 6,894,995 B2
DATED : May 17, 2005
INVENTOR(S) : Chitrapu et al.

It is certified that error appears in the above-identified patent and that said Letters Patent is hereby corrected as shown below:

Column 7,
Line 5, after the word "step", delete "607" and insert therefor -- 606 --.
Line 7, after the word "step", delete "608" and insert therefor -- 607 --.
Line 8, after the word "step", delete "609" and insert therefor -- 608 --.
Line 9, after the word "step", delete "610" and insert therefor --609 --.
Line 26, after the word "devices", delete "18$l$" and insert therefor -- $18_1$ --.

Signed and Sealed this

Sixth Day of September, 2005

JON W. DUDAS
*Director of the United States Patent and Trademark Office*